United States Patent
Murphy et al.

(10) Patent No.: US 8,623,487 B2
(45) Date of Patent: Jan. 7, 2014

(54) MODULAR SYNTHETIC GRASS TURF ASSEMBLY

(75) Inventors: Stephen Murphy, Ile Bizard (CA); Alain Bissonette, Ste-Catherine (CA); Yves Lalande, Brigham (CA)

(73) Assignee: Tarkett Inc., Farnham, Quebec (CA)

( * ) Notice: Subject to any disclaimer, the term of this patent is extended or adjusted under 35 U.S.C. 154(b) by 216 days.

(21) Appl. No.: 12/287,046

(22) Filed: Oct. 3, 2008
(Under 37 CFR 1.47)

(65) Prior Publication Data

US 2009/0208674 A1 Aug. 20, 2009

Related U.S. Application Data (60) Provisional application No. 60/997,511, filed on Oct. 3, 2007.

(51) Int. Cl.
*E01C 13/08* (2006.01)
*B32B 3/02* (2006.01)
*B32B 37/14* (2006.01)

(52) U.S. Cl.
USPC ............. 428/88; 428/89; 428/87; 428/17; 428/45

(58) Field of Classification Search
USPC ............ 428/88, 89, 87, 17, 44, 45, 47, 48, 52
See application file for complete search history.

(56) References Cited

U.S. PATENT DOCUMENTS

| | | | | |
|---|---|---|---|---|
| 7,155,796 B2* | 1/2007 | Cook | | 29/428 |
| 7,249,913 B2* | 7/2007 | Linville | | 404/73 |
| 7,273,642 B2* | 9/2007 | Prevost | | 428/17 |
| 7,300,689 B2* | 11/2007 | Prevost | | 428/17 |
| 7,387,823 B2* | 6/2008 | Waterford | | 428/17 |
| 7,722,288 B2* | 5/2010 | Prevost et al. | | 405/45 |
| 2002/0029515 A1* | 3/2002 | Prevost | | 47/1.01 F |
| 2004/0058096 A1* | 3/2004 | Prevost | | 428/17 |
| 2004/0081771 A1 | 4/2004 | Waterford | | |
| 2005/0158482 A1* | 7/2005 | Cook | | 428/17 |
| 2007/0101566 A1* | 5/2007 | Cook | | 29/428 |
| 2008/0124496 A1* | 5/2008 | Avery | | 428/17 |
| 2008/0125237 A1* | 5/2008 | Avery | | 473/278 |
| 2008/0216437 A1* | 9/2008 | Prevost et al. | | 52/589.1 |
| 2008/0219770 A1* | 9/2008 | Prevost et al. | | 405/50 |
| 2009/0094918 A1* | 4/2009 | Murphy et al. | | 52/387 |
| 2009/0208674 A1* | 8/2009 | Murphy et al. | | 428/17 |
| 2011/0020567 A1* | 1/2011 | Avery | | 428/17 |
| 2011/0201442 A1* | 8/2011 | Avery | | 473/278 |

FOREIGN PATENT DOCUMENTS

FR 2616674 A * 12/1988
JP 06272209 A * 9/1994
WO WO 2004109017 A2 * 12/2004

OTHER PUBLICATIONS

European Search Report and Written Opinion of International Application PCT/US08/11476 filed on Oct. 3, 2008.

* cited by examiner

*Primary Examiner* — Cheryl Juska
(74) *Attorney, Agent, or Firm* — Winston & Strawn LLP (57) ABSTRACT

A portable synthetic grass turf assembly—that is capable of being assembled, transported, disassembled, and stored—includes a plurality of synthetic grass module units that can be laid side by side atop a base surface to provide a continuous synthetic grass surface for various activities. Each module unit includes a synthetic grass turf with an infill layer of particulate materials disposed among the synthetic grass ribbons and atop a base sheet. A barrier of synthetic ribbons extends about the perimeter of the module unit to retain the particulate material within the module unit during its transportation and storage.

21 Claims, 6 Drawing Sheets

MODULAR SYNTHETIC GRASS TURF ASSEMBLY

RELATED APPLICATIONS

This patent application claims the filing benefit to U.S. Provisional Patent Application Ser. No. 60/997,511, filed Oct. 3, 2007—the content of which is incorporated herein by reference. This patent application is also related to Applicant's U.S. Pat. No. 7,273,642, issued Sep. 25, 2007—the contents of which are incorporated herein by reference.

TECHNICAL FIELD

The present invention is directed to a portable synthetic grass turf assembly, and more particularly, to providing a modular synthetic grass turf assembly capable of being assembled, unassembled, transported, and stored.

BACKGROUND OF THE INVENTION

A stadium is a desirable venue for multiple purposes such as football, baseball, soccer, as well as other social and civic events. The variety of activities presents a challenge to stadium personnel to convert the synthetic surface from among different configurations for a particular sport or event while providing the respective field quality expected. This is especially difficult when conversion of the sport field must be completed in a short period of time such as when the playing surface of a sporting event held during the day is to be converted to a different playing surface or social setting to be held later that evening.

Efforts well known in the industry have been made to develop a conversion system using natural grass trays. Hundreds and perhaps thousands of these trays may need to be utilized for a full field conversion between an artificial surface to a natural grass surface. These natural grass trays have proved to be very costly and difficult to use because they are especially made not only to hold the natural grass, but also to grow the grass thereon. Thus, the trays typically require appropriate drainage and moisture retention. Because the growing conditions of the natural turf are critical, the cost of maintaining the trays is high as they need to be tended to on a daily basis. Therefore, in winter, the trays usually are transported south to grow and be maintained, or are heated when used in northern climates.

Known natural grass trays—for example those disclosed in U.S. Pat. Nos. 5,595,021 and 5,187,894—describe natural turf units for stadiums and other activity surfaces that are transportable between different locations, wherein a first location is for the performance of the desired activity, and the second location is for the storage, growth, and/or maintenance of the turf units.

Synthetic grass turf assemblies have also been used to provide sport surfaces and although their advantages are many, today's infilled synthetic grass turf assemblies are generally permanently installed in stadiums and are thus inflexible and/or incapable of accommodating a variety of playing surfaces or being readily transported or adapted for conversion—either entirely or in part.

Therefore, there is a need for a system and method of providing a playing surface including a convertible and transportable synthetic grass turf assembly having an infill layer.

SUMMARY OF THE INVENTION

The present invention is directed to a method and system for a synthetic turf assembly. In one embodiment, the present invention is directed to a module unit for a portable synthetic grass turf assembly. The module unit includes a tile and a sheet backing positioned above the tile. A plurality of synthetic ribbons is attached to the sheet backing and extends upwardly there from. An infill layer of particulate material is disposed atop the sheet backing and among the synthetic ribbons to facilitate the substantially upward orientation of the synthetic ribbons. A barrier of synthetic ribbons is attached proximate the perimeter of the sheet backing, wherein the barrier assists in the retention of the particulate material on the module unit.

Another embodiment of the present invention is directed to a method of manufacturing a module unit for a modular synthetic grass turf assembly. The synthetic grass turf assembly is capable of being assembled, transported, unassembled, and stored. A tile/supporting structure is provided, wherein a sheet backing having a perimeter is positioned above the tile. A plurality of synthetic ribbons is attached to the sheet backing and extends upward there from. A barrier of synthetic ribbons is positioned proximate the perimeter and an infill layer of particular material is disposed atop the sheet backing and among the plurality of synthetic ribbons, wherein the barrier of synthetic ribbons facilitates retention of the particulate material on the module unit and enables positioning of adjacent tiles without it being readily recognizable where adjacent tiles are positioned after assembly.

In one aspect of the present invention, the synthetic ribbons of the barrier include bristles/synthetic ribbons that are relatively stiffer than the plurality of synthetic ribbons used to emulate the natural grass and thus capable of standing substantially erect without reliance on the infill layer of particulate material. Such a stiffer configuration is preferably accomplished by using a plurality of synthetic ribbons bunched together in a row and held in position with the aid of a further stiffening member, such as stitching the synthetic ribbons together through any one of a desired stitching pattern. It is also contemplated that other means for maintaining the synthetic ribbons of the barrier together can be used, including, for example adhesive, heat fusion, melting, weaving, etc. Preferably, the barrier is bunched together close enough to form a hedge, fence, or curtain so that particulate material used as the infill, will not migrate through the barrier during use, or during removal and/or installation of the modular synthetic turf assembly.

The base support surface on which the modular synthetic grass turf is to be installed may be prepared with a surface made of stabilized sand, crushed stone, asphalt, concrete, graded and compacted earth, other artificial surfaces, or any firm substrate.

An advantage of a modular synthetic grass turf assembly of the present invention is the ease of converting surfaces to and from other applications, events, and/or sports and the convenience for field and roadside advertisements. The synthetic grass module units installed on the recycled plastic sheets or trays are easily handled by a forklift vehicle to which a metal plate has been mounted to its fork arms to actually lift the units.

It is an object of the present invention to provide a modular synthetic grass turf assembly adapted for conversion of a sport surface to and/or from other applications, sports, or events.

It is another object of the present invention to provide a modular synthetic grass turf assembly adapted to provide a transportable surface for temporary use in arenas, halls, gymnasiums, or other large areas that could be utilized for sports applications.

It is another object of the present invention to provide a modular synthetic grass turf assembly adapted for use in permanent or temporary sites for roadside advertisements, logos, field lettering, field markings, and the like.

It is a still further object of the present invention to provide an easier and less costly method for converting a sports field for use with other applications or other sports.

These and other aspects and attributes of the present invention will be discussed with reference to the following drawings and accompanying specification and claims.

BRIEF DESCRIPTION OF THE DRAWINGS

Having thus generally described the nature of the present invention, reference will now be made to the accompanying drawings showing, by way of illustration, preferred embodiments in which:

FIG. 15 is a close-up view of the hinge connection of the alternate embodiment of the lip of the present invention shown in FIG. 14; and, FIG. 16 is a side view of another alternate embodiment of the lip of the present invention.

DETAILED DESCRIPTION OF THE PREFERRED EMBODIMENT

While the present invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
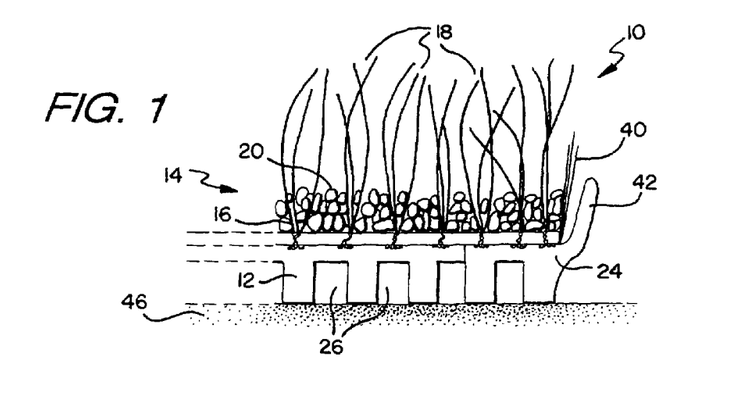
FIG. 1 is a partial cross-sectional view of a modular synthetic grass turf unit incorporating a preferred embodiment of the present invention.

Referring to the drawings, and initially to FIG. 1, a portion of a synthetic grass module unit 10 is illustrated. The module unit 10 includes a tile 12 preferably made from a continuous extruding process and cut into individual units. The tile 12 can be made of a rubberized laminated fabric or recycled plastic material that is strong enough to withstand the load expected during its intended use. Other types of materials for the tile 12 are likewise contemplated as would be readily understood to those having ordinary skill in the art. Furthermore, although the term tile has been used herein, it will be recognized that such a term is intended to cover alternative structures for supporting a synthetic grass system 14, while facilitating manipulation thereof.

The synthetic grass system 14 is placed above the tile 12 and includes a sheet backing 16 and a plurality of synthetic ribbons 18 extending upwardly from the sheet backing—representing grass blades or fibers. The synthetic ribbons 18 are operatively attached to the sheet backing 16 using any mechanism know in the industry; namely, stitching, tufting, and gluing, to name but a few. An infill layer 20 of a particulate material, such as rubber granules, sand, and any combination thereof, is disbursed atop the sheet backing 16 and among the synthetic ribbons 18 to support the synthetic ribbons in a substantially upward orientation and to further improve the impact absorption capability of the module unit 10. Such a similar synthetic turf system is utilized in known synthetic grass turf assemblies and is described in U.S. Pat. No. 5,958,527 for example—which is incorporated herein by reference and is assigned to the Assignee of this application.

Figure 2:
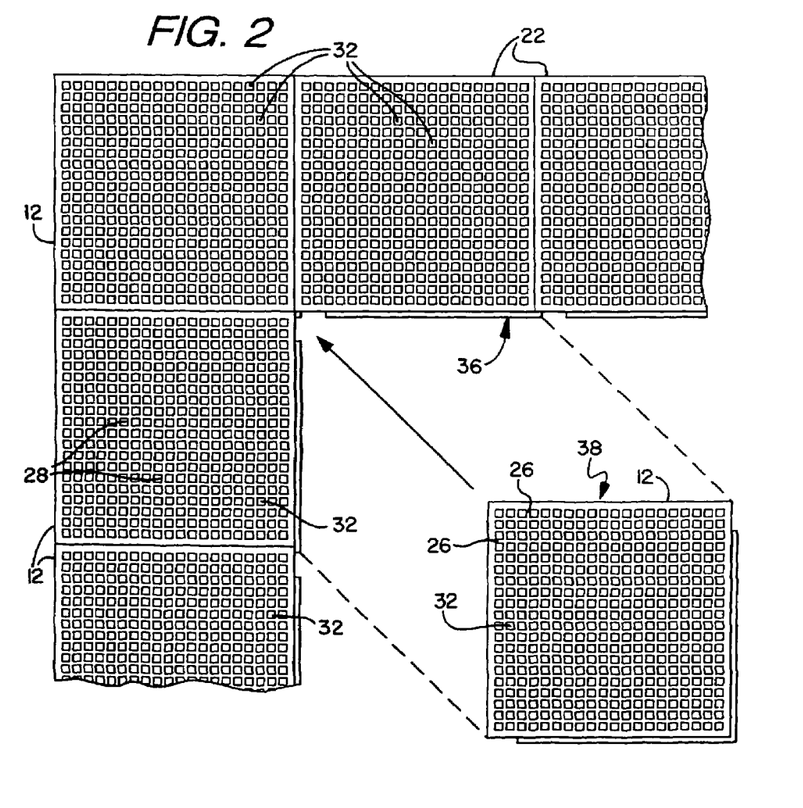
FIG. 2 is a partial plan view of the tiles used in accordance with one embodiment of the modular synthetic grass turf assembly of the present invention.
Figure 3:
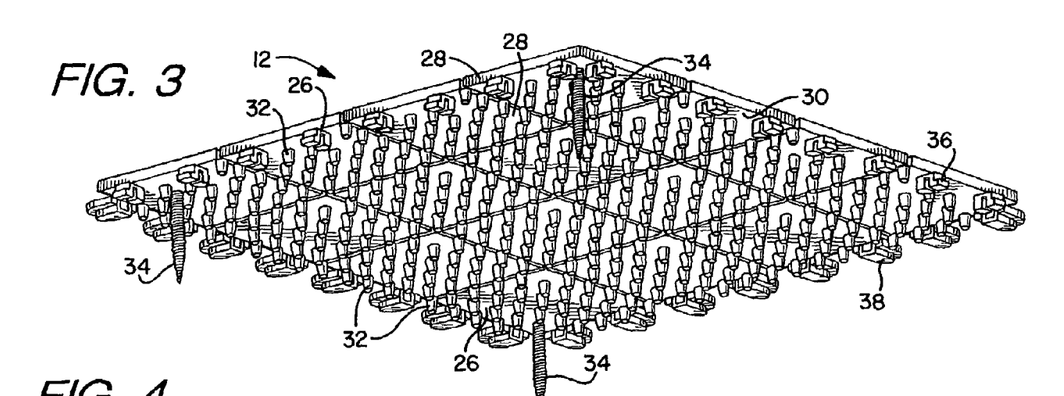
FIG. 3 is a perspective view from the bottom of the tile shown in FIG. 2.

The sheet backing 16 of the synthetic grass system 14 can be permeable or impermeable to liquid and comprise a variety of configurations having, for example, one or more layers of material that include woven or non-woven material. If the module unit 10 is to be used outdoors, the tile 12 beneath the sheet backing 16 is preferably liquid permeable to allow for drainage. An example of such a tile 12 including a means for drainage is shown in FIGS. 2 and 3 and includes a perimeter 22, which may also include a border 24 that is capable of being operatively attached to—or integral with, i.e., extending there from—a main portion of the drainage tile.

Preferably, the drainage tiles 12 are generally square, but can be of various shapes and may include a bottom surface 30 and a plurality of legs 32 extending from the bottom surface. The legs 32 define channels 26 that provide for any necessary drainage away from the tile 12 in any direction—the liquid generally flowing in a direction of least resistance away from the tile. Through-hole openings 28 vertically extend between the tile's 12 upper and lower surfaces and are provided to facilitate drainage perpendicular to the tile and the support base 46—which is generally substantially vertical—and communicate with the substantially horizontal channels 26 to allow liquid to evacuate parallel to the support surface.

If the tiles 12 include a means for drainage 28, their placement above the support substrate 46 and preferably in direct contact with the sheet backing 16 of the synthetic grass system 14 enable water to pass through the sheet backing and the openings 28 to access the channels 26 underneath the tiles 12.

A means for securing 34, e.g., stakes, can be used to anchor the tiles 12 to the supporting base substrate 46; however the securing means is not necessarily required. The weight of the infill layer 20 of the synthetic grass system 14—and perhaps the weight of the tile 12 itself—generally provides enough downwards force to maintain placement of the tiles 12. Nonetheless, the securing means 34 can be used if it is necessary to further secure the tiles 12 in place on the supporting base substrate 46.

In yet another embodiment of the present invention, means for connecting the adjacent tiles 12 are shown in FIG. 2. In particular, male 36 and female 38 connection members are disposed proximate the perimeter 24 of each tile for engagement with a mating connection member of an adjacent tile 12.

These connection members 36, 38—preferably integrally formed and extending from the tile 12—permit the tiles to be easily interconnected by simply attaching opposing connection members of abutting tiles.

Although the means for connecting can be disposed about the peripheral edges of the tile 12 of each module unit 10, the units are preferably not connected to each other but are merely abutted together. Thus, much quicker removal of the abutted module units 10 is therefore possible because no interlocking connection members between adjacent tiles 12 need to be disengaged. This greatly simplifies the effort and time required to disassemble and remove the modular synthetic grass turf assembly, as may be required during conversion of a stadium field from one sporting surface to another. However, in certain applications for which interconnection between the modular units is required or preferred, the type of interconnection chosen is preferably easily disconnected, such that the removal of the modular units can nevertheless be simply and easily be performed.

Figure 4:
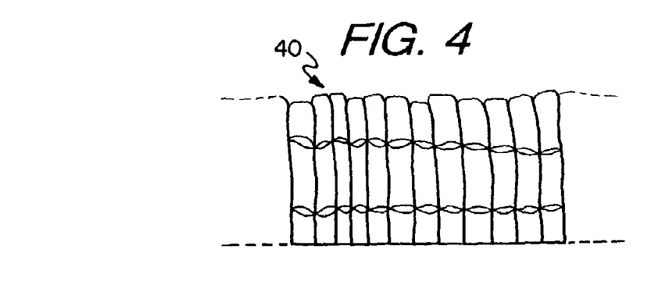
FIGS. 4-6 are partial front views of alternate embodiments of the barrier of the present invention.
Figure 5:
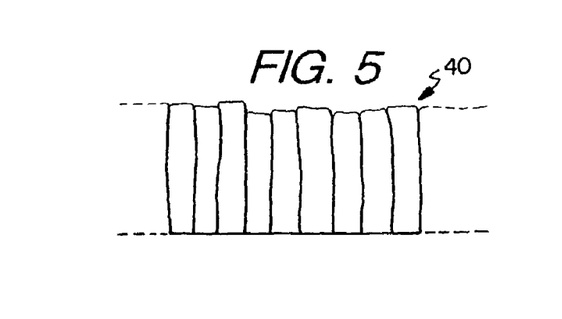
Figure 6:
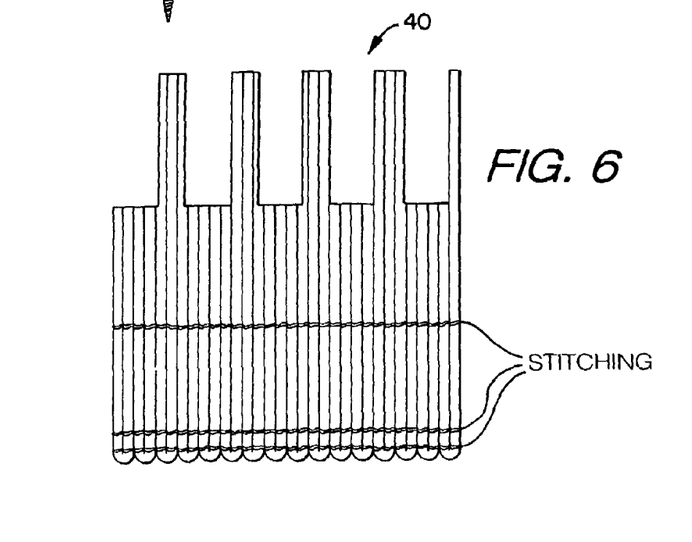

In a preferred embodiment of the present invention, the module unit 10 includes a substantially upright gathering 40 of stiffer synthetic ribbons affixed about the edge of the sheet backing 16 and/or perimeter 22 of the tile 12. The gathering 40—e.g., barrier, skirt, curtain—of synthetic ribbons is preferably relatively much stiffer than the plurality of synthetic ribbons 18 utilized to emulate the natural grass playing surface. As such, each individual synthetic ribbon of the gathering 40 can be relatively stiffer—e.g., a bristle—than the synthetic ribbon 18 utilized to emulate the strands of natural grass; or, due to the barrier's 40 configuration of synthetic ribbons, the barrier itself functions as a whole as being cumulatively more stiffer. That is, in addition to the gathering 40 comprising closely spaced individually stiffer bristles to effectively prohibit passage of the infill particulate material 20 there between, alternative barrier embodiments may be configured by weaving synthetic ribbons together, bunching synthetic ribbons together, sewing or stitching synthetic ribbons together—see FIGS. 4 and 6—and/or adhering the synthetic ribbons together through an adhesive or thermal means—see FIG. 5. Thus, the cumulative rigidity resulting from such configurations, e.g., weaving, stitching; may enable the barrier 40 to be configured of the same type of synthetic fibers used to emulate the strands of natural grass and simultaneously provide the bristle-like attributes desired.

The barrier 40 can extend from or be affixed to the sheet backing 16 about its edge; or alternatively, the barrier may be operatively attached to the tile 12 about its perimeter 22 and/or the border 24—which may or may not be removable. Barriers 40 of various heights can be attached to the associated border 24 and interchanged with the tiles 12 to provide adaptability to a variety of desired infill 20 depths associated with different field applications. In addition, the barrier 40 can have a varying height—see FIG. 6—in which some portions of the barrier extend above the layer of infill material, and perhaps as high as the plurality of ribbons 18 used to emulate the strands of natural grass. Such a barrier 40 configuration can assist in concealing the interconnection of abutting modules 10. In other embodiments of the barrier 40, its height can have multiple peaks, e.g., saw-toothed, sinusoidal; having regular or varying inclining/declining slopes.

Preferably, the depth of the infill material 20 of the synthetic turf assembly is less than or equal to the height(s) of the barrier 40. Accordingly, when the module units 10 are disassembled and removed from the support base, most of the infill layer 20 remains held within the barrier 40 and atop the backing sheet 16. The disassembled module units 10 can then be transported and/or stored as is, without having to completely remove all or any of the infill layer 20 of the synthetic grass system 14 before being relocated.

Figures 7, 8:
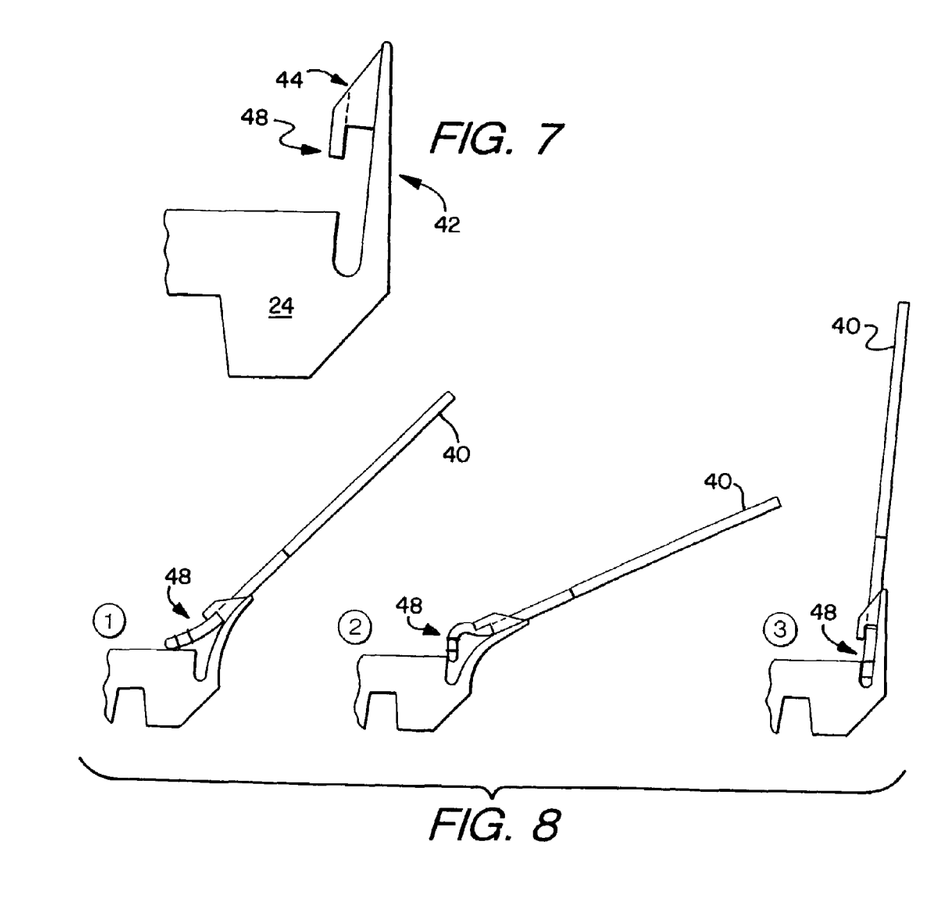
FIG. 7 is a partial side view a border of one embodiment of the present invention.
FIG. 8 depicts various stages of assembly—steps 1-3—of the barrier to the border of one embodiment of the present invention.

Additionally, a lip 42—preferably semi-rigid or flexible—can extend from or be fastened proximate the perimeter 22 of the tile 12 or its border 24. The lip 42 extends substantially upward to assist in maintaining the substantially upright orientation of the barrier 40. Preferably, the height or length of the lip 42 is less than or equal to the height(s) of the barrier 40. That is, the top of the lip 42 does not extend above the top of the barrier 40. In one embodiment shown in FIG. 7, a means for attaching 48 the barrier 40 to the module unit 10 includes a lip 42 having a slot 44 wherein the barrier can be inserted therein. Insertion of the barrier 40 into the lip 42 is shown in FIG. 8, steps 1-3. The lip 42 cooperates with the barrier 40 to retain the infill 20 within the confines of the synthetic grass module unit 10, such that the module unit can be displaced without first having to completely remove all of the infill there from.

Figure 9:
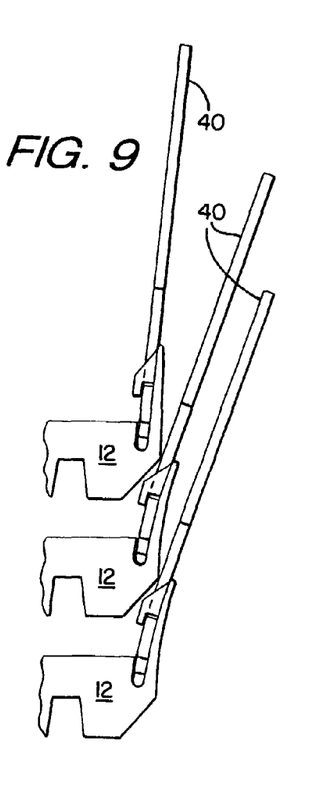
FIG. 9 is a partial view depicting several stacked module units of one embodiment of the invention.

The barrier 40 and lip 42 are preferably angled slightly outwardly from the tile 12 to which it is adhered, such that when the adjacent module units 10 abut, the barrier—and/or lip—will be slightly biased towards one another, and will thereby tend to remain in pressed engagement with each another. Such a barrier/lip configuration also enables multiple modules 10 to be stacked upon each other during storage as depicted in FIG. 9.

Other means for attaching 48 the barrier 40 with the module unit 10 can also be used. Such means for attaching 48 include, and are not limited to: interference fit, friction fit, snap fit, hook and loop fabric; wherein protrusions, nodules, stitch-joints, or other geometries of the lip 42 and/or barrier 40 that cooperate to retain the barrier to the tile 12 or border 24—thus providing a releasable (if desired) attachment of the barrier with the lip, wherein barriers with different heights can be quickly and easily attached to the module unit 10.

Figures 10, 11, 12:
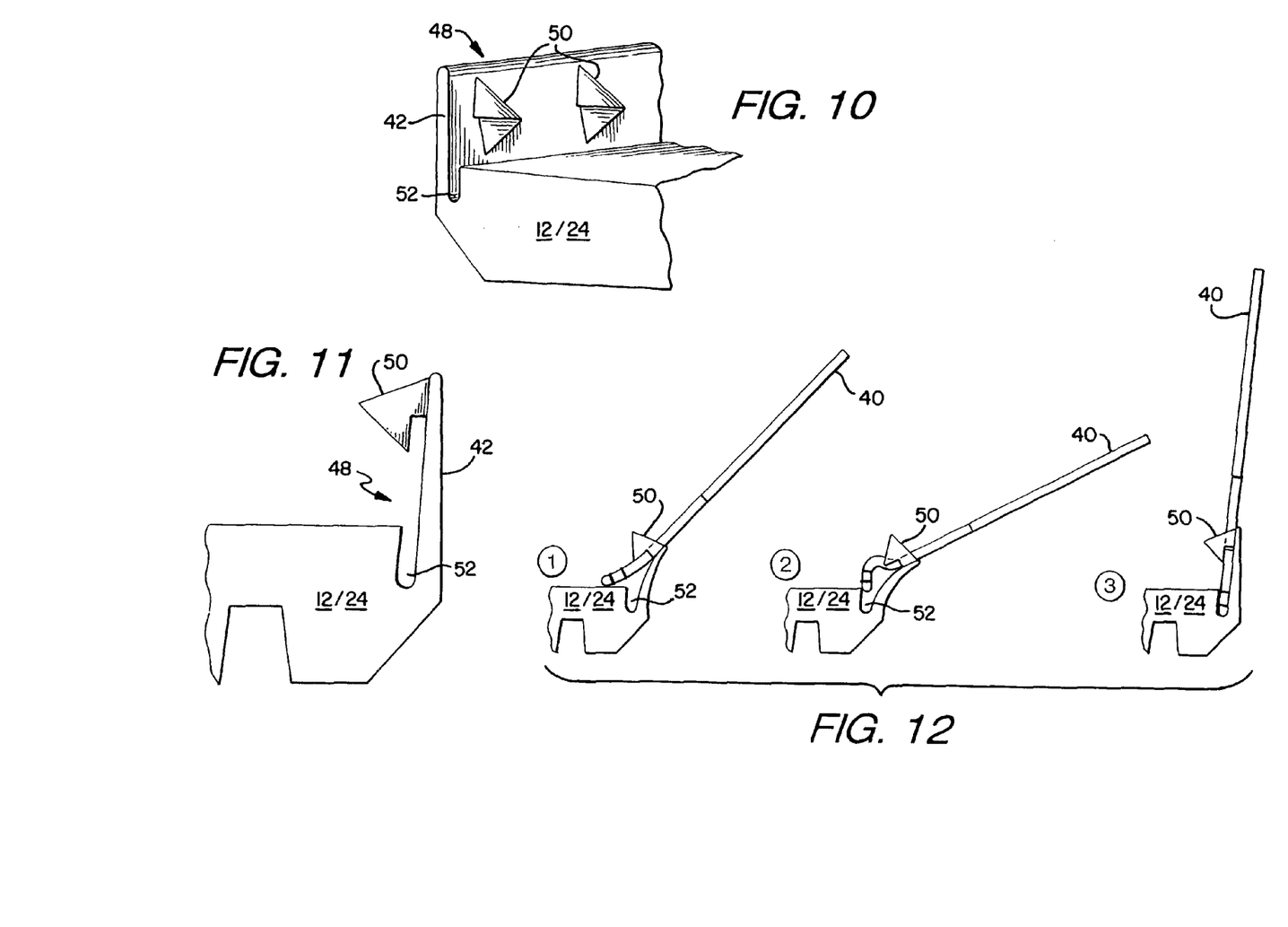
FIG. 10 is a partial perspective view of an alternative embodiment of the lip of the present invention.
FIG. 11 is a partial side view of the alternative embodiment of the lip of the present invention shown in FIG. 10.
FIG. 12 depicts various stages of assembly—steps 1-3—of the barrier into the alternate embodiment of the lip of the present invention shown in FIG. 10.

FIGS. 10-12 depict another embodiment of the means for attaching 48 the barrier 40 with the module unit 10 wherein the lip 42 includes a protrusion 50, preferably spear-shaped, extending from the lip and utilized to pierce the barrier and retain it to the lip. Preferably the spear-shaped protrusion 50 utilizes a barb to retain the barrier 40 once the spear-shaped protrusion has sufficiently penetrated the barrier. The lower edge of the barrier 40 can be placed within a subslot 52.

Figure 13:
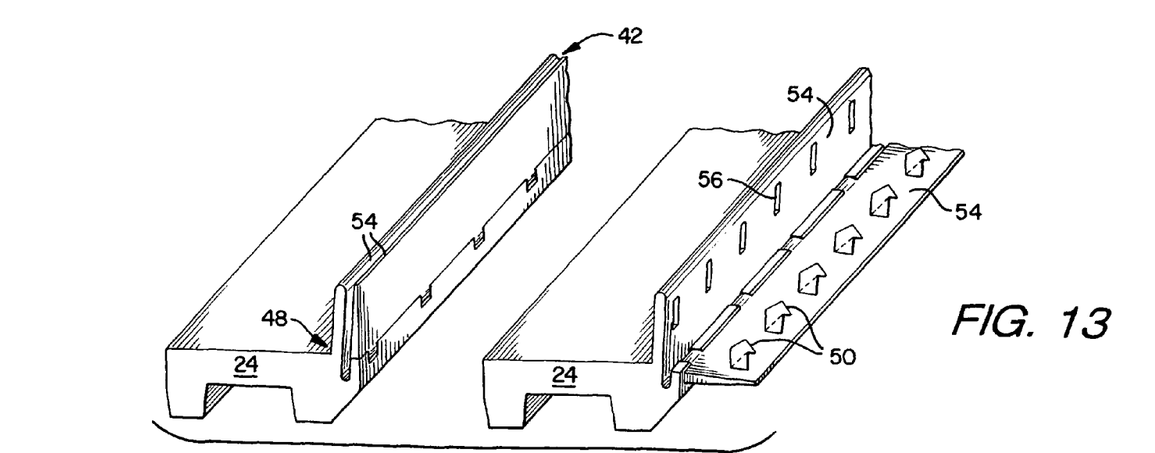
FIG. 13 is a partial perspective view of an alternative embodiment of the lip of the present invention shown in a closed and opened configuration.
Figure 14:
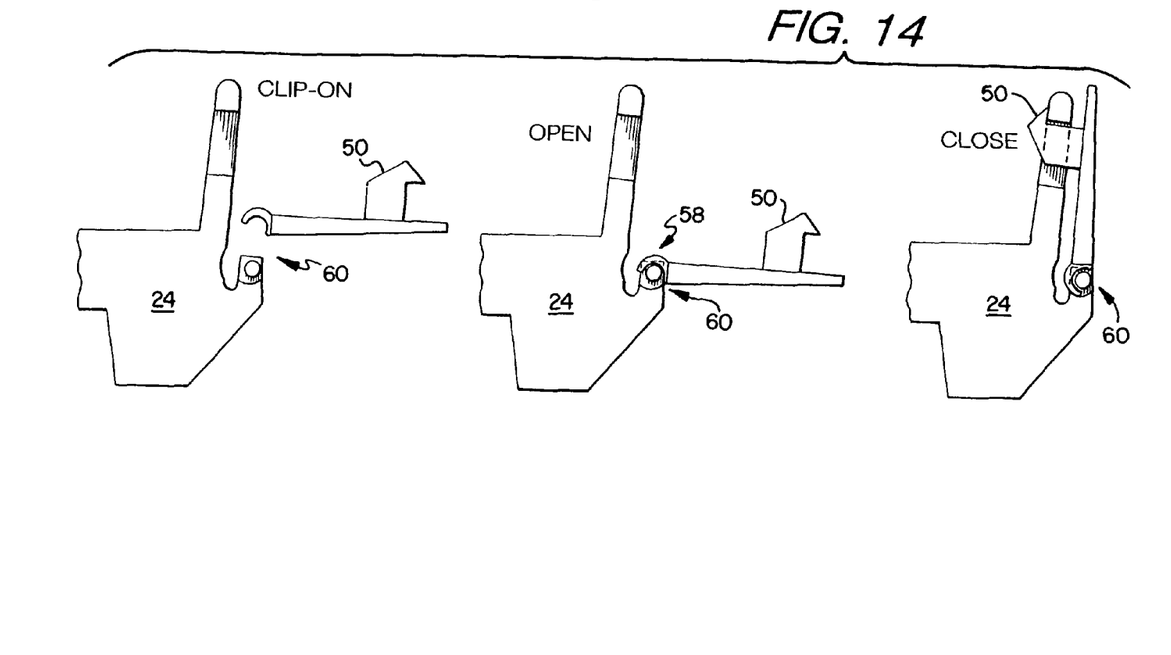
FIG. 14 is a partial side view depicting various positions of the alternate embodiment of the lip of the present invention shown in FIG. 13.
Figures 15, 16:
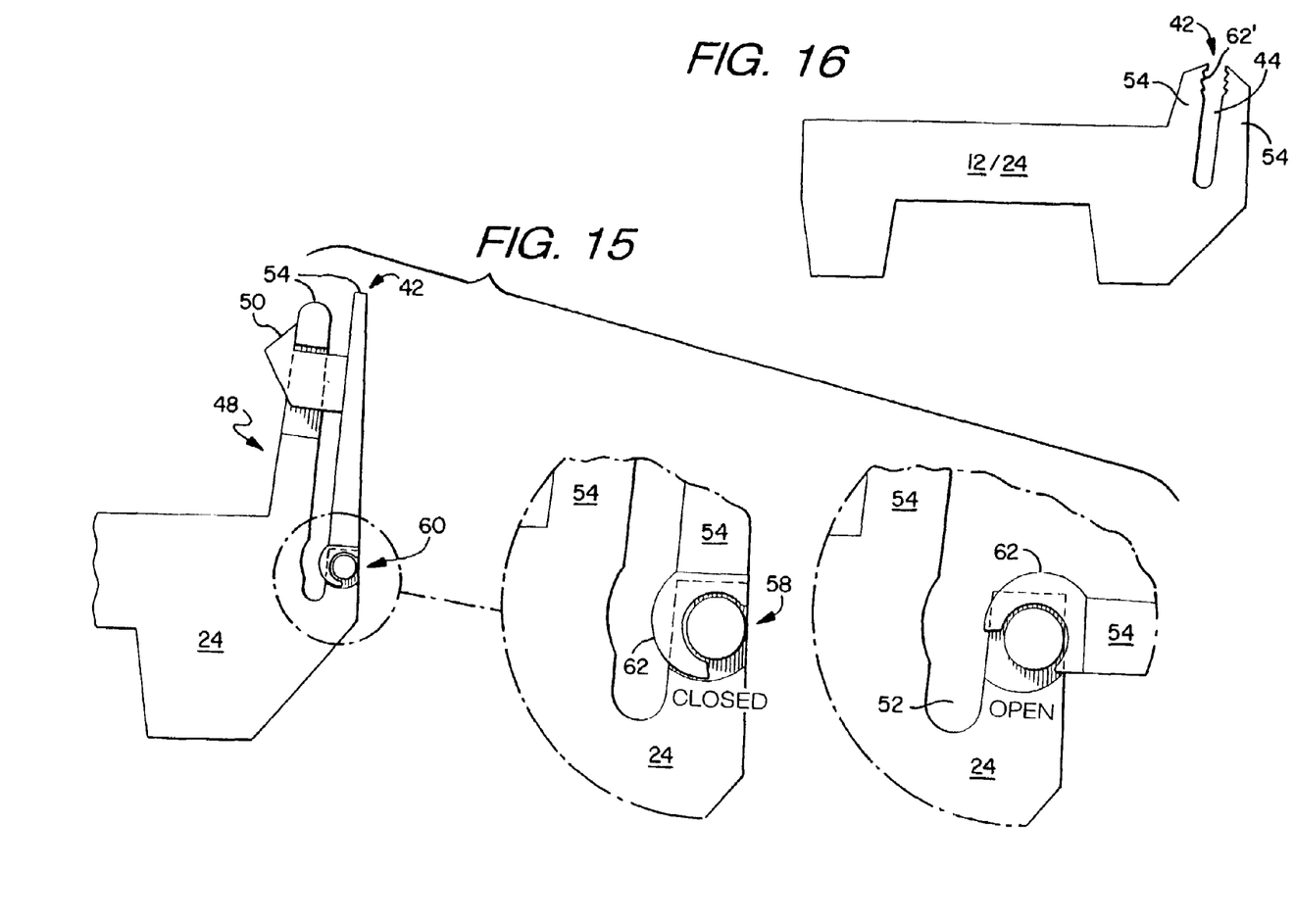

Another embodiment of the means for attaching 48 the barrier 40 to the module unit 10 is shown in FIGS. 13-15, wherein the lip 42 includes cooperating opposing walls 54 extending from the tile 12 or border 24, one of which is hingedly connected to the tile or border. The lip 42 again may include a spear-shaped protrusion 50 extending from one of the opposing walls 54 that is utilized to pierce the barrier 40 upon closing of the lip and the coming together of the cooperating opposing walls. Once the barrier 40 is pierced, the spear-shaped protrusion 52 extends into a receiving slot 56 defined within the other of the opposing lip walls 54 and is retained thereto.

The hingedly connected lip 42 can also include a cam-lock 58 preferably located proximate the hinge or pivot joint 60. The cam-lock 58 includes a protrusion 62 that cooperates with the opposing lip wall 54 to pinch and retain the barrier 40 positioned there between upon closing of the hinged lip 42.

In yet another embodiment of the means for attaching the barrier 40 to the module unit 10 shown in FIG. 16, the lip 42 and slot 44 include at least one protrusion 62' therein. Preferably, multiple protrusions 62' extend from the opposing side walls 54 within the slot 44 such that the barrier 40—once seated therein—is operatively retained from removal. If desired, the barrier 40 can be removed from the lip 42 by overcoming the retention function of the protrusion(s) 62', thus permitting another barrier 40—perhaps having a different height—to be implemented and inserted therein.

During use, the module units 10 are preferably laid directly onto the base support surface substrate 46 of the stadium or facility to have the synthetic grass turf assembly thereon. If desired, through-hole openings 28 can be provided within the individual tiles 12 to permit drainage therethrough. The sheet backing 16 has the plurality of synthetic ribbons 18 extending upwardly therefrom and is laid atop the upper surface of each tile 12 and the infill layer 20 can then be dispersed among the synthetic ribbons 18 within the barrier 40. Once the adjacent module units 10 are positioned in place on the base substrate 46, a final layer of infill material is preferably added to cover over the areas of abutment between adjacent tiles 12.

It is to be understood that although means for aligning the module units 10 are not necessarily needed with the preferred embodiment of the present invention, their use as known in the prior art is within the scope of the present invention. In addition, inasmuch as the use of the alignment structures is often limited to certain circumstances, such as outdoor stadiums; other circumstances exist—such as halls and gymnasia having wood floors and other ground surfaces—in which installation of the alignment tracks on the base substrate would damage the finish of base surface, e.g., wood or padded floors; and is therefore is not acceptable. As such, the use of alternative interlocking means without the need to mount tracks or other engagement members to the base substrate as known in the prior art is also envisioned to be within the scope of the present invention.

Additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A module unit for a portable synthetic grass turf assembly, the module unit comprising:
   a tile;
   a sheet backing including a perimeter, the sheet backing positioned above the tile;
   a plurality of synthetic ribbons attached to the sheet backing and extending upwardly therefrom;
   an infill layer of particulate material disposed atop the sheet backing and among the plurality of synthetic ribbons; and,
   a barrier of synthetic ribbons attached proximate the perimeter, wherein the barrier facilitates retention of the particulate material on the module unit, wherein at least some of the synthetic ribbons of the barrier extend above the infill layer of particulate material and the barrier has a varying height and, wherein the synthetic ribbons of the barrier are woven together at a point along the height of the barrier via a weaving yarn.

2. The module unit of the portable synthetic grass turf assembly of claim 1, wherein the synthetic ribbons of the barrier include bristles, wherein the bristles are relatively stiffer than each of the plurality of synthetic ribbons.

3. The module unit of the portable synthetic grass turf assembly of claim 1, wherein the barrier of synthetic ribbons includes the plurality of synthetic ribbons being bunched together.

4. The module unit of the portable synthetic grass turf assembly of claim 1, wherein the barrier having a top edge including at least one inclining slope.

5. The module unit of the portable synthetic grass turf assembly of claim 4, wherein the top edge further including at least one declining slope.

6. The module unit of the portable synthetic grass turf assembly of claim 1, wherein the synthetic ribbons of the barrier are adhered together with an adhesive.

7. The module unit of the portable synthetic grass turf assembly of claim 1, wherein the barrier of synthetic ribbons is attached to the sheet backing proximate the perimeter.

8. The module unit of the portable synthetic grass turf assembly of claim 7, wherein the barrier of synthetic ribbons is glued and/or stitched to the sheet backing.

9. The module unit of the portable synthetic grass turf assembly of claim 1, wherein the tile includes a border proximate its perimeter.

10. The module unit of the portable synthetic grass turf assembly of claim 9, wherein the border is removably attached to the tile.

11. The module unit of the portable synthetic grass turf assembly of claim 9, wherein the barrier of synthetic ribbons is attached to the border of the tile.

12. The module unit of the portable synthetic grass turf assembly of claim 1, further comprising a means for attaching the barrier of synthetic ribbons to the module unit proximate the perimeter of the sheet backing.

13. The module unit of the portable synthetic grass turf assembly of claim 1, further comprising a means for attaching the barrier with the module unit.

14. The module unit of the portable synthetic grass turf assembly of claim 13, wherein the means for attaching the barrier with the module unit includes a border operatively attached to the tile, the border including a lip operatively attached to or extending from the border wherein the height of the lip is less than or equal to the height of the plurality of synthetic ribbons.

15. The module unit of the portable synthetic grass turf assembly of claim 13, wherein the means for attaching the barrier with the module unit includes a lip operatively attached to or extending from the tile, wherein the height of the lip is less than or equal to the height of the plurality of synthetic ribbons.

16. The module unit of the portable synthetic grass turf assembly of claim 15, wherein the means for attaching the barrier with the module unit further includes a friction fit, interference fit, snap fit, a cam lock, stitching, heating, and/or adhesive.

17. A module unit for a synthetic grass turf assembly capable of being assembled and unassembled, the module unit comprising:
   a tile having a border;
   a sheet backing including a perimeter, the sheet backing positioned above the tile;
   a plurality of synthetic ribbons attached to the sheet backing and extending upwardly therefrom;
   an infill layer of particulate material disposed atop the sheet backing and among the synthetic ribbons; and,
   a barrier of synthetic ribbons stitched together at a point along a height of the barrier via a stitching yarn and attached proximate the border, wherein the barrier facilitates retention of the particulate material on the module unit, wherein at least some of the synthetic ribbons of the barrier extend above the infill layer of particulate material.

18. The module unit of claim 17, wherein the border is releasably attached to the tile.

19. The module unit of claim 17, further comprising a means for attaching the barrier to the module unit.

20. A method of manufacturing a module unit for a synthetic grass turf assembly capable of being assembled and unassembled, the method comprising the steps of:
providing a tile;
positioning a sheet backing above the tile, the sheet backing including a perimeter;
attaching a plurality of synthetic ribbons to the sheet backing;
attaching a barrier of synthetic ribbons proximate the perimeter; and,
weaving the synthetic ribbons of the barrier together at a point along a height of the barrier via a weaving yarn; and,
disposing an infill layer of particulate material atop the sheet backing and among the synthetic ribbons, wherein the barrier of synthetic ribbons facilitates retention of the particulate material on the module unit, wherein at least some of the synthetic ribbons of the barrier extends above the infill layer of particulate material and the height of the barrier varies.

21. A method for providing a synthetic grass surface using module synthetic grass units comprising steps of:
providing a base surface for supporting the synthetic grass surface in a first location;
transporting from a second location a plurality of module synthetic grass units to the first location; each of the module synthetic grass units comprising:
a support tile having a border;
a sheet backing including a perimeter, the sheet backing positioned above the support tile;
a plurality of synthetic ribbons attached to the sheet backing and extending upwardly there from;
an infill layer of particulate material disposed atop the sheet backing and among the plurality of synthetic ribbons; and,
a barrier of synthetic ribbons stitched together at a point along a height of the barrier via a weaving yarn and attached proximate the border, wherein the barrier facilitates retention of the particulate material on the module unit, wherein at least some of the synthetic ribbons of the barrier extend above the infill layer of particulate material; and,
placing the units on the supporting base surface according to a predetermined layout and fitting the units side by side to provide a substantially continuous synthetic grass surface.

* * * * *